United States Patent Office 3,812,019
Patented May 21, 1974

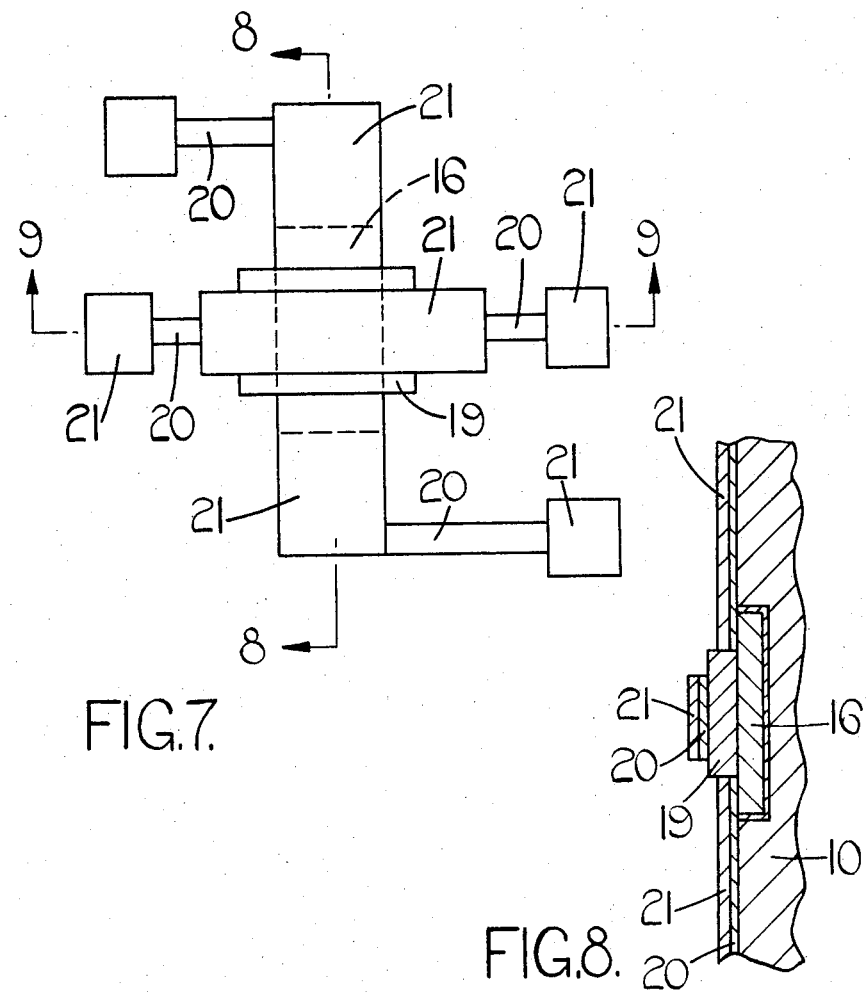
FIG.7.
FIG.8.
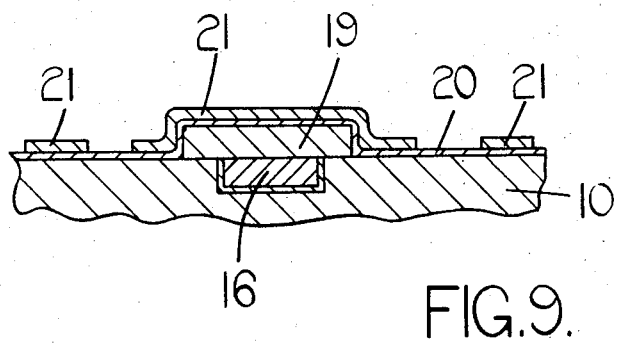
FIG.9.

3,812,019
METHOD OF PRODUCING ELECTRIC WIRING ARRANGEMENT
Victor Needham, Balsall Common, and Brian Francis Bowen, Hall Green, England, assignors to Joseph Lucas (Industries) Limited, Birmingham, England
Filed July 14, 1972, Ser. No. 271,729
Claims priority, application Great Britain, July 14, 1971, 32,931/71
Int. Cl. C23b *5/48;* B41m *3/08;* H05k *1/00*
U.S. Cl. 204—15
32 Claims

ABSTRACT OF THE DISCLOSURE

A method of producing an electric wiring arrangement of the kind having a plurality of conductors formed as thin films on an insulating base, and wherein the conductors crosses one another and are mutually insulated at the crossover point, includes forming channels in the base at the crossover points, filling the channels with conductive material, applying insulating material which covers part of the material in the channels and extends on to the adjacent insulating base, and applying a pattern of conductive material which extends over the insulating material to form the crossover and also contacts the exposed material in the channels.

---

Figure 1:
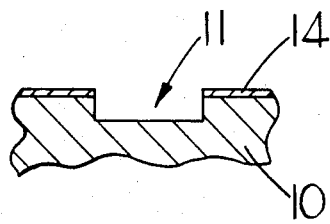

This invention relates to a method of producing electric wiring arrangements of the kind having a plurality of conductors formed as thin films on the same side of an insulating base, and wherein one of the conductors is required to cross another of the conductors, the said conductors being mutually insulated at the crossover point.

According to the invention a method of producing a wiring arrangement of the foregoing kind includes the steps of forming a plurality of channels in said base at locations thereon corresponding to the parts of one of the conductors which lie at, and adjacent to, a crossover point, substantially filling the channels with conductive material, applying a layer of insulating material to the conductive material in the channels and to the base adjacent the channel, and applying a pattern of conductive material to said base and to said insulating material so as to complete said conductors, the said pattern for one conductor being conductively connected to the material in the channels, and said other conductor extending over said insulating material to form the crossovers.

An example of the invention will now be described with reference to the accompanying drawings, in which:

FIGS. 1 to 6 show, somewhat diagrammatically, successive steps in the production of a part of a wiring arrangement, FIG. 7 is a plan view of a part of a completed wiring arrangement, FIGS. 8 and 9 are sections on the corresponding lines in FIG. 7, and FIGS. 10 to 17 show diagrammatically alternative steps in the production of part of a wiring arrangement.

Referring first to FIGS. 1 to 6, a base 10 of an insulating material, which is preferably a vitreous enamel layer applied to a metal sheet has channels 11 etched therein at locations which correspond to the positions at which the conductors of the finished wiring arrangement are to cross over one another. The channels 11 are formed by a known sputter etching process. A mask for the sputter etching is provided as follows:

A copper film is deposited by sputtering onto the face of the base 10. This film is approximately 2000 A.U. (2 x $10^{-5}$ cm.) in depth. A layer of copper is then electro-plated onto the copper film. This copper layer is, for reasons later to be explained, several times as thick as the required depth of the channels 11. The channel depth is typically of the order of one micron ($10^{-4}$ cm.).

A pattern of etchant resistive material is applied to the copper layer over those areas of the base 10 from which the channels 11 are not to be etched. The copper layer and copper film are then chemically etched from the exposed areas, leaving a copper mask which exposes the areas of the base 10 to be sputter etched.

The sputter etching process attacks both the copper and the base 10, the copper being etched away at about four times the rate of the base, this being the reason for the thickness of electro-plated copper, which is such that a layer of copper 14 remains on the unetched surfaces, of the plate 10 when the channels 11, are complete.

Figure 2:
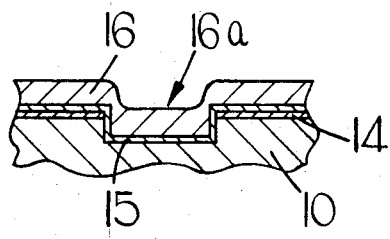
Figure 3:
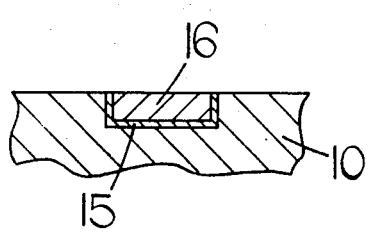

As shown in FIG. 2, a film 15 of nickel-chrome alloy is then sputter deposited on the face of the base 10 and the copper layer 14 so as to enter the channel 11, the depth of the sputtered alloy being 200 A.U. A layer 16 of nickel is sputtered onto the film 15, to a depth of approximately 9000 A.U. whereby the upper face 16a of the layer 16 is substantially level with the face of base 10, care being taken that face 16a does not extend proud of base 10.

The base 10 and its metal adhesions are then etched with a chemical which attacks the copper only, as for example ferric chloride or ammonium persulphate. The etchant undercuts the copper layer 14 and, by removing support for the film 15 and layer 16 outside the channel 11, allows this film 15 and layer 16 to become detached, resulting in the configuration shown in FIG. 3.

Figure 4:
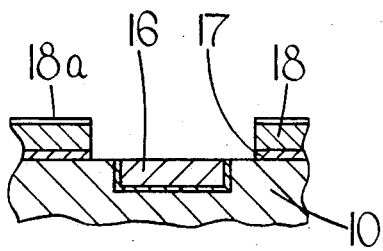

A layer of insulating material, as for example silicon-dioxide, is applied to the layer 16 and to the base 10 on either side of the layer 16. A copper mask for this insulating layer is prepared by sputtering a copper film 17 all over the appropriate side of the base 10, electro-plating a layer 18 of copper onto the film 17, applying an etch resist to the areas of the copper layers 18 corresponding to the areas to which the insulating layer is not to be applied, and etching the exposed copper away and then removing the resist. The resultant mask is shown in FIG. 4.

Figure 5:
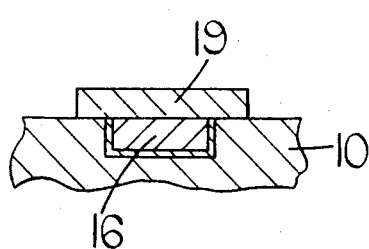

The insulating layer 19 is sputtered on over the mask, which is then chemically etched away, as already described with reference to FIG. 2, to leave the configuration shown in FIG. 5. The thickness of the layer 19 is typically between 4000 A.U. and 6000 A.U. It has been found advantageous to leave the resist layer 18a on the copper layer 18, since this has the effect of reducing adhesion of the insulating layer 19 to the masking copper layer 18. Unwanted areas of insulation are thus more easily removed.

Figure 6:
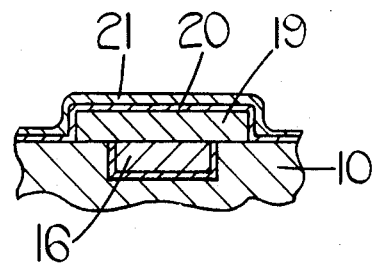
Figure 10:
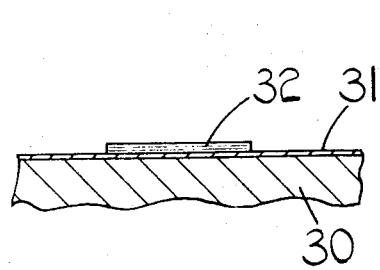

The required conductor patterns are then completed as follows. A film 20 of nickel-chrome alloy is sputtered all over the appropriate side of the arrangement so far prepared, followed by a layer 21 of gold sputtered over the nickel-chrome. The layer 21 is between 2000 A.U. and 3000 A.U. thick, the thickness of the film 20 being determined by the required resistance of the conductor pattern at given locations thereon as later described. The resulting arrangement is as shown in FIG. 6.

An etch-resist mask is applied to those areas of the gold layer 21 at which conductive material is required to remain and the exposed areas of layer 21 are removed with a suitable chemical etchant. The areas of film 20 which have been exposed by removal of layer 21 are then etched away chemically until the surface of base 10 is exposed. A further etch resist mask is applied so as to leave exposed those areas of the gold layer 21 at which the final conductor pattern is to include resistors. The exposed areas of gold are etched away to leave the nickel-chrome alloy exposed.

FIGS. 7, 8 and 9 show views of part of a resultant wiring pattern. At the crossover point the conductors are separated by the insulating layer 19. It will be seen that layer 19, when formed by the steps shown in FIGS. 4 and 5, has an accurately controlled depth and there is no possibility of the insulating material falling away from the corners of a conductor on which layer 19 is superimposed. The control which can be exercised on the dimensions of the layer 19, together with the areas of the conductors above and below it, also enables a crossover point as above described to provide a capacitor of known value.

The exposed areas of the layer 20 provide resistors within the conductor pattern, the gold plated areas providing low resistance interconnections and terminal pads.

Figure 11:
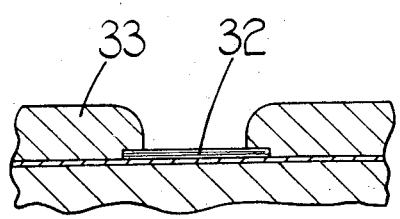
Figure 12:
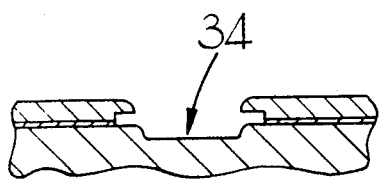
Figure 13:
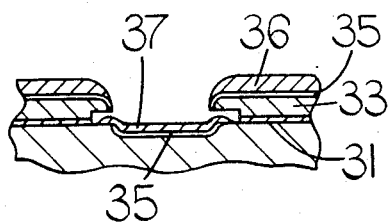

In the alternative steps shown in FIGS. 10 to 17 a mask for sputter-etching channels in a base 30 is formed by sputter deposition of a copper film 31 all over the base 30, applying a pattern of resist 32 to areas of the film 31 corresponding to desired locations of the channels and electro-plating the exposed areas of the film 31 with a layer of copper 33. The copper layer 33 is plated to a depth substantially greater than the thickness of the resist 32, to provide an "overhang" as seen in FIG. 11. The resist 32 is removed and the arrangement is lightly chemically etched to remove the exposed area of film 31.

The assembly is then sputter-etched, to provide the required channels 34, the copper layer 33 acting as a mask. During the sputter etching process the thickness of layer 33 is reduced, the initial thickness of layer 33 nevertheless being sufficient to ensure that the overhang is still present when etching of channels 34 is complete.

A film 35 of nickel-chrome alloy is sputter-deposited onto all exposed surfaces, followed by a sputtered layer 36 of nickel. The shadowing effect of the overhung parts of layer 33 has the effect of imparting a rounded edge to the portion 37 of the nickel within the channels 34, and also of providing a discontinuity between the nickel portion 37 and the remainder of the nickel layer 36.

Figure 14:
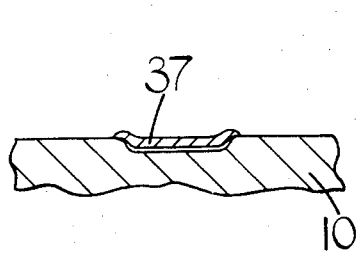

The assembly is then treated with an etchant which attacks the copper only. Assisted by the zones beneath the overhangs the etchant under-cuts the layer 33 and film 31, thereby removing support for the film 35 and layer 36 outside the channel 34. The resultant configuration is shown in FIG. 14.

Figure 15:
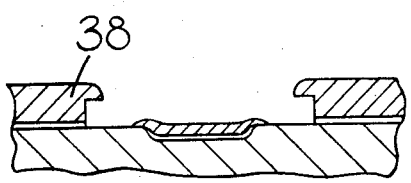
Figure 16:
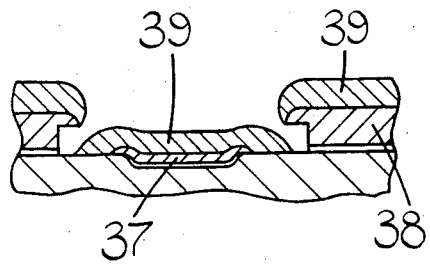
Figure 17:
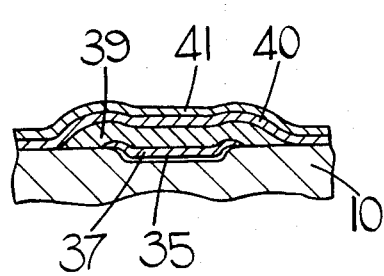

As shown in FIG. 15 a further copper mask 38 is then applied in the same way as described above with reference to FIGS. 10 to 12. Mask 38 is provided with overhangs and is for use in sputter-depositing an insulating layer 39 (FIG. 16). The overhangs act, as before, to provide rounded edges to the layer 39, and to ensure discontinuity between the areas of layer 39 which overlay the channels 34, and the remainder of layer 39.

The assembly is once again exposed to copper etchant to remove the mask 38 and unwanted areas of layer 39. A film 40 of nickel-chrome alloy is sputter deposited over the whole surface of the assembly, followed by a sputtered layer 41 of gold, the resultant configuration being shown in FIG. 17.

This configuration is then selectively etched, as described above with reference to FIGS. 7, 8 and 9, to provide a desired wiring arrangement.

It is to be understood that the relative dimensions of the layers and the channels shown in the drawings are not to scale, and are by way of illustration only.

We claim:

1. A method of producing electric wiring arrangements having a plurality of conductors formed as thin films on the same side of a common insulative base, wherein one of the conductors crosses another of the conductors, said conductors being mutually insulated at the crossover point, said method comprising the steps of forming a plurality of channels in the base at locations thereon corresponding to the parts of one of the conductors which lie at, and adjacent to, a crossover point, substantially filling the channels with conductive material, applying a layer of insulating material to the conductive material in the channels and to the base adjacent the channel, and applying a pattern of conductive material to said base and to said insulating material so as to complete said conductors, the said pattern for one conductor being conductively connected to the material in the channels, and said other conductor extending over said insulating material to form the crossovers.

2. A method as claimed in claim 1 in which said channels are formed by providing a mask which leaves said locations exposed, and sputter etching said mask and said exposed locations.

3. A method as claimed in claim 2 in which said mask is formed of copper and has a thickness such that a layer of said mask remains after said channels have been formed.

4. A method as claimed in claim 2 in which said mask is applied to said base by sputtering and subsequent electroplating.

5. A method as claimed in claim 3 in which the filling of said channels with conductive material includes the steps of applying a first conductive layer to said base and said remaining mask layer and subsequently etching away said remaining mask layer to detach from said base those portions of said first conductive layer which do not lie within said channel.

6. A method as claimed in claim 5 in which said first conductive layers is applied by sputtering.

7. A method as claimed in claim 5 in which a second conductive layer is applied to said first conductive layer, portions of said second conductive layer being removed with said portions of the first conductive layer when said remaining mask layer is etched away.

8. A method as claimed in claim 7 in which said second conductive layer is applied by sputtering.

9. A method as claimed in claim 5 in which said first conductive layer comprises a nickel-chrome alloy.

10. A method as claimed in claim 7 in which said second conductive layer is formed of nickel.

11. A method as claimed in claim 1 in which application of said insulating layer includes the steps of providing a further mask which leaves uncovered those areas at which said insulating layer is required, applying said insulating material to said further mask and said uncovered areas and etching away said further mask to detach from said base those portions of the insulating material which do not comprise said required areas.

12. A method as claimed in claim 11 in which the mask for said insulating layer is provided by applying a copper layer over said side of the base and the conductive material in said channel, and etching away said copper layer at said required area of insulating material.

13. A method as claimed in claim 12 in which the copper layer for said mask for said insulating layer is applied by sputter depositing a copper film and subsequently electroplating.

14. A method as claimed in claim 1 in which said insulating layer is applied by sputtering.

15. A method as claimed in claim 1 in which said insulating layer comprises silicon dioxide.

16. A method as claimed in claim 1 in which application of said pattern of conductive material includes the steps of depositing a layer of conductive material over said base and said insulating material, and selectively etching away said conductive material for said pattern.

17. A method as claimed in claim 16 in which said layer of conductive material for said pattern comprises a film of nickel-chrome alloy and a coating of gold on the alloy film.

18. A method as claimed in claim 17 in which said alloy film and said gold coating are applied by sputtering.

19. A method as claimed in claim 17 in which said coating and said alloy film are successively etched away at locations where said pattern is not required, and said gold coating is subsequently etched away from said pattern at locations thereon which are required to act as resistors.

20. A method as claimed in claim 3 in which said mask is formed by a process which includes the steps of sputter-depositing a first layer of copper on said side of said base, applying an etch resist pattern to said first layer at locations thereon which overlie said channel locations, electro-depositing a second layer of copper on said first layer so that said second layer of copper overlaps the edges of each element of the resist pattern, removing the resist, and etching away exposed portions of said first layer.

21. A method as claimed in claim 20 in which application of said layer of insulating material includes the steps of providing a further mask which leaves uncovered those areas at which said insulating layer is required, applying said insulating material to said further mask and said uncovered areas and etching away said further mask to detach from said base those portions of the insulating material which do not comprise said required areas.

22. A method as claimed in claim 21 in which said further mask is formed by a process which includes the steps of sputter depositing a first coating of copper on said side of said base and said conductive material in said channels, applying a further etch-resist pattern to said first coating at locations thereon which correspond to required areas of insulating material, electro-depositing a second coating of copper on said first layer so that said second layer of copper overlaps the edges of each element of the further resist pattern, removing the resist, and etching away the exposed portions of said first coating.

23. A method as claimed in claim 20 in which said conductive material in said channels includes a layer which is applied by sputtering.

24. A method as claimed in claim 23 in which said layer of conductive material comprises a nickel-chrome alloy.

25. A method as claimed in claim 23 in which said conductive material in said channels includes a further layer which is applied by sputtering.

26. A method as claimed in claim 25 in which said further layer is comprised of nickel.

27. A method as claimed in claim 20 in which said insulating layer is applied by sputtering.

28. A method as claimed in claim 20 in which said insulating layer comprises silicon dioxide.

29. A method as claimed in claim 20 in which application of said pattern of conductive material includes the steps of depositing a layer of conductive material over said base and said insulating material, and selectively etching away said conductive material for said pattern.

30. A method as claimed in claim 29 in which said layer of conductive material for said pattern comprises a nickel-chrome alloy film and a coating of gold on the alloy film.

31. A method as claimed in claim 30 in which said alloy film and said gold coating are applied by sputtering.

32. A method as claimed in claim 30 in which said coating and said alloy film are successively etched away at locations where said pattern is not required, and said gold coating is subsequently etched away from said pattern at locations thereon which are to act as resistors.

References Cited

UNITED STATES PATENTS

| | | | |
|---|---|---|---|
| 3,350,498 | 10/1967 | Leeds | 174—68.5 |
| 3,395,040 | 7/1968 | Pritchard, Jr. et al. | 117—212 |
| 3,525,617 | 8/1970 | Bingham | 117—212 |
| 3,616,282 | 10/1971 | Bodway | 204—15 |
| 2,961,385 | 11/1960 | McGall | 204—15 |

THOMAS M. TUFARIELLO, Primary Examiner

U.S. Cl. X.R.

29—625; 174—68.5